United States Patent Office 3,005,752
Patented Oct. 24, 1961

3,005,752
TREATMENT OF SOIL AND COMPOSITIONS THEREFOR
Clyde W. McBeth, Modesto, and Edmund F. Feichtmeir, Ripon, Calif., assignors to Shell Oil Company, a corporation of Delaware
No Drawing. Filed Nov. 6, 1957, Ser. No. 694,748
2 Claims. (Cl. 167—39)

This invention pertains to a novel composition of matter for improved control of soil-borne phytopathogenic invertebrate organisms, particularly nematodes, and to the treatment of agricultural soil infested with such parasites of plants.

It is well known that 1,3-dichloropropene has the valuable property of high toxicity towards nematodes and other soil-borne plant parasites, such as fungi, and that it can be used to combat these organisms in soil. This compound is most often used, and is most widely available commercially, in the form of a mixture with 1,2-dichloropropane, that is produced as a high-boiling by-product by chlorination of propylene to yield allyl chloride. These mixtures typically contain approximately equal parts by weight of the 1,3-dichloropropene and the 1,2-dichloropropane, although mixtures wherein the weight ratio of these two compounds may vary from about 5:1 to about 1:5, preferably from about 1:1 to about 3:1, can be used effectively for treating agricultural soils. Such mixtures have come to be extensively used for protecting such crops as pineapple against the biological complex of complexes naturally occurring in pineapple fields of the Hawaiian Islands, tobacco, cotton, tomato and the like against the root-knot nematode (*Heterodera meloidogyne*), nursery stock against Anomala larvae, citrus crops against "slow decline," and the sugar beet against the sugar beet nematode (*Heterodera schachtii*) and other parasites to which it is subject to attack.

1,3-dichloropropene, or mixtures thereof with 1,2-dichloropropane, are used for agricultural purposes by disseminating the compound or mixture into the soil to be treated, as by spraying the compound or mixture as such or in the form of a solution of emulsion onto the soil and either mechanically working or washing it down into the soil, by adsorbing the compound or mixture onto a solid carrier which then is mixed with the soil, or by burying friable capsules containing the compound or the mixture in the soil at intervals. Most commonly, the compound or mixture is injected directly into the soil in measured dosage either by hand or by tractor-drawn mechanical equipment that has been developed for the purpose. The required dosage depends upon a number of factors, such as whether 1,3-dichloropropene alone is used, or where mixtures of 1,3-dichloropropene and 1,2-dichloropropane are used, the amount of the former present in the mixture. The kind of soil, its moisture content, the severity and kind of infestation, and the kind of crop that is to be planted in the treated soil also are factors which affect the required dosage. An illustrative figure for the required dosage of typical mixtures of 1,3-dichloropropene and 1,2-dichloropropane is about 20 gallons of the mixture per acre, although depending upon the circumstances as little as 10 gallons of the mixture per acre may be used or as much as 100 gallons of the mixture per acre may be required. Whatever the figure, it represents a substantial cost to the farmer, orchardist or horticulturist which is justified only by reason of the reduced yields of crop that would be obtained without such treatment of the soil.

The present invention is directed to a method for reducing substantially the dosage of 1,3-dichloropropene, whether this compound be used alone, or in admixture with 1,2-dichloropropane, required for effective treatment of soils to be used for the growing of agricultural and horticultural crops. Expressed otherwise, it is an object of the invention to increase the activity, as toxicants towards nematodes, wireworms, fungi, and other soil-borne, phytopathogenic invertebrate organisms, of 1,3dichloropropene, and of mixtures of 1,3-dichloropropene and 1,2-dichloropropane. As a result of the invention, it has been found possible to reduce the dosage of 1,3-dichloropropene, or mixtures thereof with 1,2-dichloropropane, required for effectively treating agricultural soil. It also has been found possible to extend materially the present limited supply of 1,3-dichloropropene, and mixtures of 1,3-dichloropropene and 1,2-dichloropropane, making them available to consumers whose needs otherwise could not be met.

The present invention is based upon the discovery that addition of 1-chloro-2,3-dibromopropane to 1,3-dichloropropene, and to mixtures of this compound with 1,2-dichloropropane, greatly increases the toxicity thereof, in soil, towards nematodes and other phytopathogenic microorganisms which they are used to combat.

But a minor amount of 1-chloro-2,3-dibromopropane is required to markedly enhance the toxicity of 1,3-dichloropropene, whether that compound be used alone, or in the usual commercial mixtures with 1,2-dichloropropane. Thus, noticeable enhancement of the toxicity towards nematodes of a typical commercial mixture containing equal weights of 1,3-dichloropropene and 1,2-dichloropropane is obtained by incorporating therewith sufficient 1-chloro-2,3-dibromopropane to provide a concentration of one percent by weight of 1-chloro-2,3-dibromopropane in the final composition. Or, in other words, a composition containing 1,3-dichloropropene and 1-chloro-2,3-dibromopropane in which the 1-chloro-2,3-dibromopropane amounts to as little as two percent of the sum of the weights of the 1,3-dichloropropene and 1-chloro-2,3-dibromopropane is markedly more effective as a nematode than is the 1,3-dichloropropene alone. Compositions containing substantially greater concentrations of the 1-chloro-2,3-dibromopropane likewise are markedly more effective as nematocides than are corresponding compositions containing no 1-chloro-2,3-dibromopropane. Thus, compositions comprising up to 50% by weight of 1-chloro-2,3-dibromopropane, the remainder being the typical 50:50 weight mixture of 1,3-dichloropropene and 1,2-dichloropropane (corresponding to a composition of about 70% by weight of 1-chloro-2,3-dibromopropane and about 30% by weight of 1,3-dichloropropene) may be used to advantage as compared to the same compositions containing no 1-chloro-2,3-dibromopropane. However, from the standpoint of efficacy, as well as of economic advantage, the preferred compositions are those in which the 1-chloro-2,3-dibromopropane concentration, calculated on the bases of the sum of the weights of the 1-chloro-2,3-dibromopropane and 1,3-dichloropropene in the compositions, amounts to from about 4% to about 40%. In terms of the usual 50:50 weight mixture of 1,3-dichloropropene and 1,2-dichloropropane, the preferred 1-chloro-2,3-dibromopropane concentration is thus from about 2% to about 25% of the weight of the total mixture.

Our invention is based upon our discovery that 1-chloro-2,3-dibromopropane, when present with 1,3-dichloropropene or mixtures of 1,3-dichloropropene and 1,2-dichloropropane, enhances the toxicity of the latter towards soil-borne plant parasites to an extent that is wholly disproportionate to the amount of 1-chloro-2,3-dibromopropane present and its toxicity when applied alone. For example, in treating soil heavily infested with the root-knot nematode (*Heterodera meloidogyne*), 1,3-dichloropropene, in the form of a typical mixture with 1,2-dichloropropane and containing about equal amounts of each of these compounds, was distributed by injection 6 to 8 inches below the surface of the soil in amounts found to kill approximately one-half of the nematode population. In a second plot, 1-chloro-2,3-dibromopropane was distributed by injection 6 to 8 inches below the surface of the soil in an amount found upon later examination of the soil to have been sub-toxic—that is, without observable effect upon the nematode population. For a third plot this sub-lethal concentration of 1-chloro-2,3-dibromopropane was added to the mixture of 1,3-dichloropropene and 1,2-dichloropropane to form a product containing about 10% by weight of the 1-chloro-2,3-dibromopropane. Treatment of the soil with this mixture at the same rate of application of the mixture of the dichloropropene and dichloropropane used in the first of the three plots led to complete eradication of nematodes from the soil in the vicinity of the point of injection.

Although the invention is not to be construed as limited in accordance with any theoretical considerations, it is believed that the benefits that are realized by practice of the invention are attributable to a hitherto unrecognized pronounced dissimilarity in the action on nematodes of 1,3-dichloropropene and mixtures thereof with 1,2-dichloropropane, and the 1-chloro-2,3-dibromopropane. It appears that 1-chloro2,3-dibromopropane has a more or less pronounced narcotic effect upon nematodes, acting apparently on the amphidial organs or amphids and also probably on other parts of the nervous or sensory system, such as the cervical ganglia and tactile papillae. In contrast, 1,3-dichloropropene and mixtures thereof with 1,2-dichloropropane act primarily as direct chemical poisons, entering the system either through the digestive tract or by absorption directly through the cuticle and hypodermis and inhibiting or preventing general cellular metabolism. It is believed that the narcotic or depressant action of the 1-chloro-2,3-dibromopropane may lead to an increase in the absorption of the chemical toxicant by the organism in the presence of a given concentration in the soil, or else that the depressant action may lead to a reduced general level of body metabolism that may make the body cells more susceptible to the direct toxic action of the dichloropropene and the mixture of dichloropropene and dichloropropane. Whatever may be its precise physiological explanation, the effect of the two types of materials applied together is markedly and unexpectedly greater than would be expected from the individual actions of either one alone.

The novel compositions of this invention can be prepared by simply mixing the individual liquid components, in any order. Thus, 1,3-dichloropropene or a mixture of 1,3-dichloropropene and 1,2-dichloropropane, or the separate 1,3-dichloropropene and 1,2-dichloropropane are mixed with 1-chloro-2,3-dibromopropane in any order.

The compositions of the invention can be applied to the soil by any of the methods known for treating the soil to control soil-borne parasites of plants. They may be introduced directly into the soil, with or without diluents or extenders, by injection or drilling, or by trickling measured amounts into the furrow behind a plowshare or disc. When diluents or extenders are employed, the composition may be a homogeneous solution, such as a solution in a naphtha or other petroleum fraction, or a heterogeneous dispersion, such as an aqueous emulsion. The compositions can be emulsified in irrigation water and applied to soil concurrently with the normal irrigation practice. The composition also can be adsorbed or absorbed upon or in a solid carrier, such as clay, wood flour, or the like, and the impregnated solid worked into the soil by discing or harrowing. In any case, it is desirable that the toxic composition be introduced from about 2 inches to a foot or more below the surface of the soil. Application may be to selected portions of the field, as along rows planted or to be planted, or more or less broadcast over the entire field.

The rates of application necessarily will depend upon such factors as the type of soil, its moisture content, the temperature, the depth of application, the crop, if any growing in the soil, and like factors which are recognized by those skilled in the art. In general, the dosage will be within the range of from about one to about 200 gallons of the active composition per acre but, for equal effectiveness, less than the dosage that would be required for 1,3-dichloropropene, or mixtures thereof with 1,2-dichloropropane, without the 1-chloro-2,3-dibromopropane. A wide variety of infestations can be controlled by use of the compositions of the invention, more economically than heretofore possible. To mention only a few of the crops for which the compositions of the invention can be employed, there are tobacco, which can be protected against nematode diseases and such secondary invasions as fusarium wilt and black shank, cotton, tomatoes, melons, potatoes, etc., which can be protected against meadow nematode (*Pratylenchus pratensis*), the root-knot nematode (*Heterodera meloidogyne*) and the sting nematode (*Belonoaimus gracilis*) and the sugar beet against the sugar beet nematode and citrus trees against the citrus nematode.

As a further example of the invention, one-gallon glazed crocks were filled with soil heavily infested with the root-knot nematode. To one crock there was added and thoroughly mixed with the soil a solution of 0.016 ml. of 1-chloro-2,3-dibromopropane in an inert solvent. To the second crock there was added and thoroughly mixed with the soil 0.124 ml. of a 50:50 by weight mixture of 1,2-dichloropropane and 1,3-dichloropropene in an inert solvent. To the third crock there was added and mixed with the soil a solution of 0.032 ml. of a mixture of 1 part 1-chloro-2,3-dibromopropane and 9 parts of the 1,3-dichloropropene-1,2,-dichloropropane mixture. The three crocks were covered and stored for one week at 80° F. The soil then was transferred from each of the crocks into eight 4-inch clay pots and the twenty-four pots were seeded with tomatoes. After six weeks a nematode count was made on the soil. The following results were obtained:

| Toxicant: | Percent control of nematodes |
|---|---|
| 1-chloro-2,3-dibromopropane alone | 3 |
| Mixture of 1,2-dichloropropane and 1,3-dichloropropene, 50:50 weight ratio | 15 |
| 1 part 1-chloro-2,3-dibromopropane+9 parts mixture of 1,2-dichloropropane and 1,3-dichloropropene in 50:50 weight ratio | 38 |

Better than a two-fold increase in control of the nematodes was obtained. In the above results, the figures for percent control of the nematodes are values obtained from visual counts of the nematode population before and after the tests. A figure of 0% control indicates no observable mortality and a figure of 100% control would indicate complete kill. It must be noted that the compositions provided by this invention normally effect substantially complete kill of all nematodes in the ground treated with those compositions. In each of the examples included herein a dosage of the composition which would not effect substantially complete kill of the nematodes in the test soil was deliberately chosen to make it possible to illustrate by quantitative figures the enhanced toxicity of the composition of the invention.

This application is a continuation-in-part of our copending applications Serial Nos. 491,193 (filed February 28, 1955), now abandoned, and 651,139 (filed April 8, 1957), now abandoned, Serial No. 651,139 being, in turn, a continuation-in-part of Serial No. 491,193.

We claim as our invention:

1. A fumigant composition having as active toxic ingredients 1,2-dibromo-3-chloropropane and a mixture of 1,3-dichloropropene and 1,2-dichloropropane, the amount of 1,2-dibromo-3-chloropropane being from about 18% to about 70% of the sum of the weights of the 1,2-dibromo-3-chloropropane and 1,3-dichloropropene.

2. In the treatment of soil by disseminating thereinto a volatile toxicant active against nematodes, the step which comprises disseminating into the soil as toxicant a composition defined by claim 1.

References Cited in the file of this patent

UNITED STATES PATENTS

| | | |
|---|---|---|
| 2,502,244 | Carter | Mar. 28, 1950 |
| 2,543,580 | Kay | Feb. 27, 1951 |

FOREIGN PATENTS

| | | |
|---|---|---|
| 124,387 | Australia | June 12, 1947 |

OTHER REFERENCES

Ichikawa et al.: "Soil Diffusion Pattern of 1, 2-Dibromo-3-Chloropropane," Phytopathology, vol. 45, No. 10, Oct., 1955, page 576.

Agri. Chemicals, February 1956, page 61.

Wadley: "The Evidence Required to Show Synergistic Action of Insecticides and A Short Cut in Analisis," U.S. Dept. Agric. Publication ET-223, June 1945.